US009414352B2

(12) United States Patent
Lee

(10) Patent No.: US 9,414,352 B2
(45) Date of Patent: Aug. 9, 2016

(54) METHOD AND APPARATUS FOR CORRECTING LOCATION INFORMATION OF MOBILE COMMUNICATION TERMINAL

(75) Inventor: Hyung Keun Lee, Paju-si (KR)

(73) Assignee: Industry-University Cooperation Foundation Korea Aerospace University, Goyang-si (KR)

( * ) Notice: Subject to any disclaimer, the term of this patent is extended or adjusted under 35 U.S.C. 154(b) by 1262 days.

(21) Appl. No.: 12/302,943

(22) PCT Filed: Dec. 15, 2006

(86) PCT No.: PCT/KR2006/005502
§ 371 (c)(1),
(2), (4) Date: Dec. 1, 2008

(87) PCT Pub. No.: WO2007/148860
PCT Pub. Date: Dec. 27, 2007

(65) Prior Publication Data
US 2009/0184867 A1    Jul. 23, 2009

(30) Foreign Application Priority Data

Jun. 17, 2006    (KR) .................... 10-2006-0054610

(51) Int. Cl.
*H04W 24/00*    (2009.01)
*H04W 64/00*    (2009.01)

(52) U.S. Cl.
CPC ................................ *H04W 64/006* (2013.01)

(58) Field of Classification Search
None
See application file for complete search history.

(56) References Cited

U.S. PATENT DOCUMENTS 4,891,761 A * 1/1990 Gray .................. G01C 21/32
                                                340/993
6,198,914 B1   3/2001 Saegusa
6,901,260 B1   5/2005 Xin
(Continued)

FOREIGN PATENT DOCUMENTS

JP    2002-071780    3/2002
JP    2005-266627    9/2005
(Continued)

OTHER PUBLICATIONS

Korean Office Action dated May 9, 2007 for Korean Patent Application No. 10-2006-0054610.
(Continued)

*Primary Examiner* — German J Viana Di Prisco
(74) *Attorney, Agent, or Firm* — NSIP Law

(57) ABSTRACT

A method and apparatus for correcting location information of mobile communication terminals is disclosed. The apparatus for correcting location information of mobile communication terminals, includes: a handler to collect location measurement information of the mobile communication terminals, and environment information containing locations of base stations and arrangements of roads or buildings from a network; a database to store the location measurement information and the environment information; an analysis unit to analyze the location measurement information and the environment information to generate correction maps; a correction map database to store the correction maps; and a service unit to refer to the correction maps and to provide a corrected location estimate service, a corrected location measurement service, or a correction-value broadcast service to mobile communication terminals which request location services.

14 Claims, 7 Drawing Sheets

(56) References Cited

U.S. PATENT DOCUMENTS

| | | | |
|---|---|---|---|
| 7,535,849 B2* | 5/2009 | Laiho et al. | 370/241.1 |
| 2001/0018344 A1* | 8/2001 | Tervo et al. | 455/435 |
| 2002/0193942 A1* | 12/2002 | Odakura et al. | 701/207 |
| 2003/0114169 A1* | 6/2003 | Okamura et al. | 455/456 |
| 2004/0127228 A1 | 7/2004 | You et al. | |
| 2006/0211376 A1* | 9/2006 | Bhattacharya et al. | 455/67.11 |

FOREIGN PATENT DOCUMENTS

| | | |
|---|---|---|
| KR | 2005-0102339 | 4/2004 |
| KR | 2004-0067533 | 7/2004 |
| KR | 2006-0104393 | 3/2005 |
| KR | 2006-0061104 | 6/2006 |

OTHER PUBLICATIONS

Decision to Grant for Korean Patent Application No. 10-2006-0054610.
Written Opinion for PCT/KR2006/005502.
International Search report for PCT/KR2006/005502.

* cited by examiner

METHOD AND APPARATUS FOR CORRECTING LOCATION INFORMATION OF MOBILE COMMUNICATION TERMINAL

CROSS-REFERENCE TO RELATED APPLICATIONS

This application is a National Stage of International Application No. PCT/KR2006/005502, filed Dec. 15, 2006 and published as WO2007/148860 on Dec. 27, 2007, which claims the benefit of Korean Patent Application No. 10-2006-0054610, filed on Jun. 17, 2006, the entire disclosures of which are incorporated herein by reference for all purposes.

TECHNICAL FIELD

The present invention relates to a technology of measuring the location of a mobile communication terminal and, more particularly, to a method and apparatus for correcting location information of a mobile communication terminal, which corrects spatiotemporal errors contained in actual location information of the mobile communication terminal to generate a correction map.

BACKGROUND ART

Location-based services (LBS) are offered by some mobile terminal networks as a way to send custom advertising and other information to mobile terminal users based on their current location. Location-based services are provided through positioning methods which can quickly provide accurate location information of mobile communication terminals, such as mobile phones and PDAs, to users of the mobile communication terminals. Examples of the positioning methods include navigation satellite-based positioning and terrestrial-based positioning. The navigation satellite-based positioning uses pseudorange, accumulated carrier phase, Doppler shift and the like which are obtained through satellites, such as GPS, GLONASS or Galileo. The terrestrial-based positioning uses the time of arrival (TOA), time difference of arrival (TDOA), angle of arrival (AOA), or signal strength (SS) of a signal which are obtained through network infrastructure for mobile telecommunications.

In the event the terrestrial-based positioning is employed to provide the location-based services in urban centers, non-line-of-sight (NLOS) may occur due to obstacles, such as buildings. In order to remove the non-line-of-sight and provide a more accurate location-based service, a spatiotemporal error contained in the location information of a mobile communication terminal needs to be calculated and corrected. For this purpose, correction receivers are installed at several known locations, or receivers are mounted on vehicles to receive location information through GPS.

DISCLOSURE OF INVENTION

Technical Problem

However, there has not been proposed a technology of using location measurement information of unspecified mobile communication terminals which are automatically collected from telecommunication networks to extract spatiotemporal correction information, and using the spatiotemporal correction information to correct the location information of the mobile communication terminals.

Technical Solution

The present invention provides a method and apparatus for correcting location information of mobile communication terminals, which quickly provides accurate location information by correcting spatiotemporal errors extracted from automatically-collected location measurements, road topography and the like.

Additional features of the invention will be set forth in the description which follows, and in part will be apparent from the description, or may be learned by practice of the invention.

Advantageous Effects

According to the present invention, since a correction map is generated from wireless signals automatically collected from mobile communication terminals and is used to provide a location estimate or a correction value to the location estimate at the request of a user, it is possible to simply provide a more accurate location estimate or a more accurate correction value to the location estimate.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

BEST MODE FOR CARRYING OUT THE INVENTION

Figure 1:
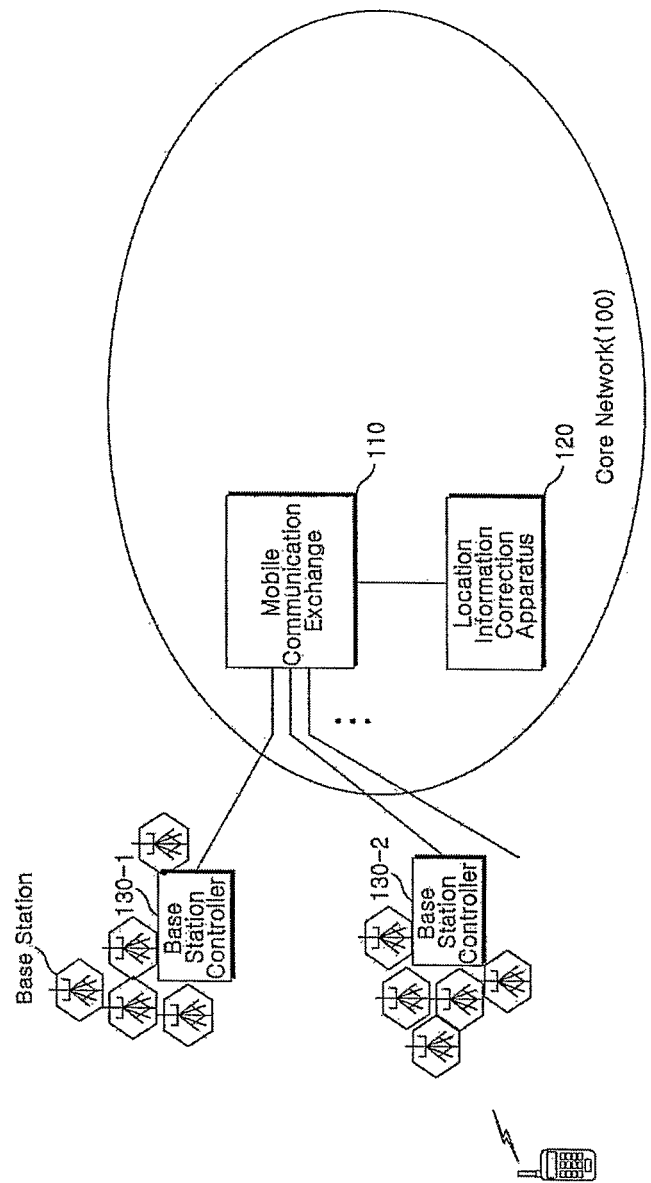
FIG. 1 illustrates an apparatus for correcting location information of mobile communication terminals which is provided in a core network according to an exemplary embodiment of the present invention.

The present invention discloses an apparatus for correcting location information of mobile communication terminals, including: a handler to automatically collect location measurement information of the mobile communication terminals, and environment information containing locations of base stations and arrangements of roads or buildings from a network; a database to store the location measurement information and the environment information; an analysis unit to analyze the location measurement information and the environment information to generate correction maps; a correction map database to store the correction maps; and a service unit to refer to the correction maps and to provide a corrected location estimate service, a corrected location measurement service, or a correction-value broadcast service to mobile communication terminals which request location services.

The present invention also discloses a method for correcting location information of mobile communication terminals, including: collecting location measurement information of the mobile communication terminals, and environment information containing locations of base stations and arrangements of roads or buildings from a network; generating a correction map by analyzing the location measurement information and the environment information; and providing a corrected location estimate service, a corrected location measurement service, or a correction-value broadcast service to mobile communication terminals by using the correction map.

It is to be understood that both the foregoing general description and the following detailed description are exemplary and explanatory and are intended to provide further explanation of the invention as claimed.

Mode for the Invention

The invention is described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

FIG. 1 illustrates an apparatus for correcting location information of mobile communication terminals which is provided in a core network according to an exemplary embodiment of the present invention.

In the event a core network 100 is a mobile communication network, the core network 100 includes a mobile communication exchange 110 and an apparatus for correcting location information (hereinafter also referred to as a "location information correction apparatus") 120. Each of base stations exchanges data with mobile communication terminals within its cell via a wireless link therebetween. Each of base station controllers 130-1 and 130-2 is responsible for the exchange of messages towards the mobile communication exchange. Traffic and signaling transferred between the mobile communication exchange and mobile communication terminal will usually pass transparently through the base station controller 130-1 or 130-2.

The mobile communication exchange 110 includes a mobile switching center (MSC), a home location register (HLR) and a visitor location register (VLR).

MSC is a communication switch within a mobile network architecture which is capable of interworking with location databases. The MSC is responsible for mobility management, and location registration, management, authentication, handover and roaming of mobile communication terminals.

HLR is the main database of permanent subscriber information for a mobile communication network and interacts with the MSC. The HLR contains pertinent user information, including address, account status, and preferences.

VLR maintains temporary user information, such as current location, to manage requests from subscribers who are out of the area covered by their home system.

Although the location information correction apparatus 120 is provided within the core network 100 in FIG. 1, the location information correction apparatus 120 may be provided outside the core network 100. In the event the location information correction apparatus 120 is provided outside the core network 100, the location information correction apparatus 120 may collect the location information of mobile communication terminals, which is provided from the mobile communication terminals to the mobile communication network, either from an element constituting the core network 100, such as the MSC, over a wired network, or through frequency information and protocol in wireless manner.

Figure 2:
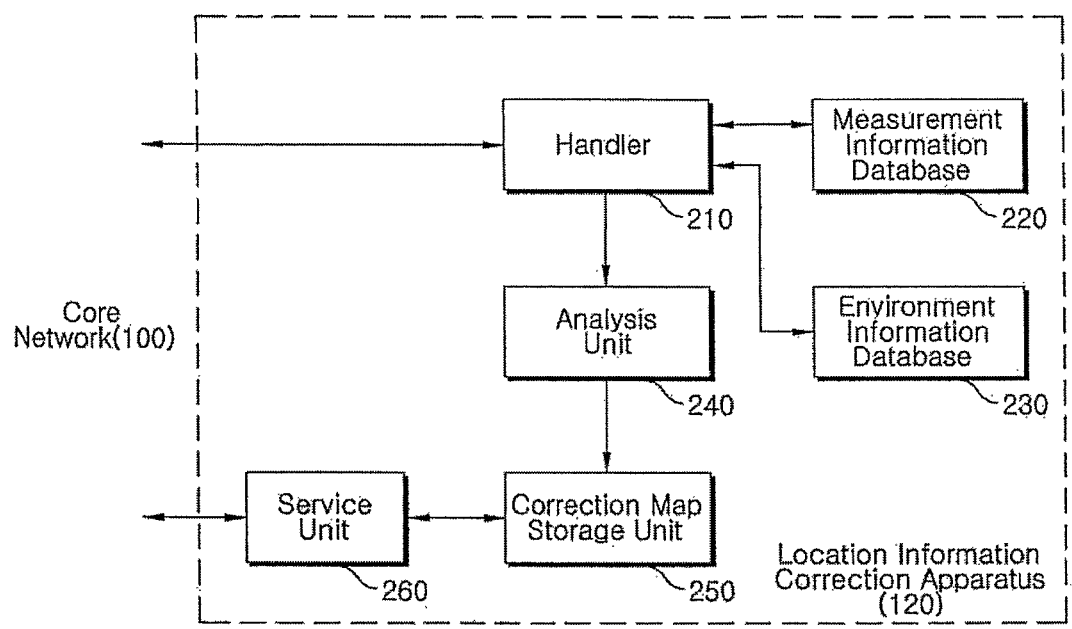
FIG. 2 is a block diagram of an apparatus for correcting location information of mobile communication terminals according to an exemplary embodiment of the present invention.

FIG. 2 is a block diagram of a location information correction apparatus according to an exemplary embodiment of the present invention.

The location information correction apparatus 120 includes a handler 210, a measurement information database 220, an environment information database 230, an analysis unit 240, a correction map storage unit 250, and a service unit 260. The measurement information database 220, the environment information database 230 and the correction map storage unit 250 may be integrated into a single storage unit.

The handler 210 receives location measurement information and environment information over the core network 100, and stores the information in the measurement information database 220 and the environment information database 230, respectively.

The measurement information database 220 collects information concerning any subsets of signal strength (SS), time of arrival (TOA) of signal, time difference of arrival (TDOA) of signal, angle of arrival (AOA) of signal, and events or values related to measurement time and location from a mobile communication terminal over a wireless communication network. The above-mentioned information is collected from many and unspecified mobile communication terminals and is accumulated. A distribution of the unspecified mobile communication terminals can be calculated from the accumulated information.

The environment information database 230 stores an electronic map showing coordinates of base stations and arrangement of roads and buildings, and a signal profile related to specific locations. The signal profile may be directly collected using a mobile communication terminal or extracted by proposed methods.

The analysis unit 240 generates a correction map from measurement information and environment information stored in the measurement information database 220 and the environment information database 230, respectively, and stores the correction map in the correction map storage unit 250. The correction map is generated based on a distorted location estimate of a user with information such as bias, covariance and threshold.

The service unit 260 uses the correction map to provide a corrected location estimate to a mobile communication terminal or broadcasts coefficients for the correction map.

Figure 3:
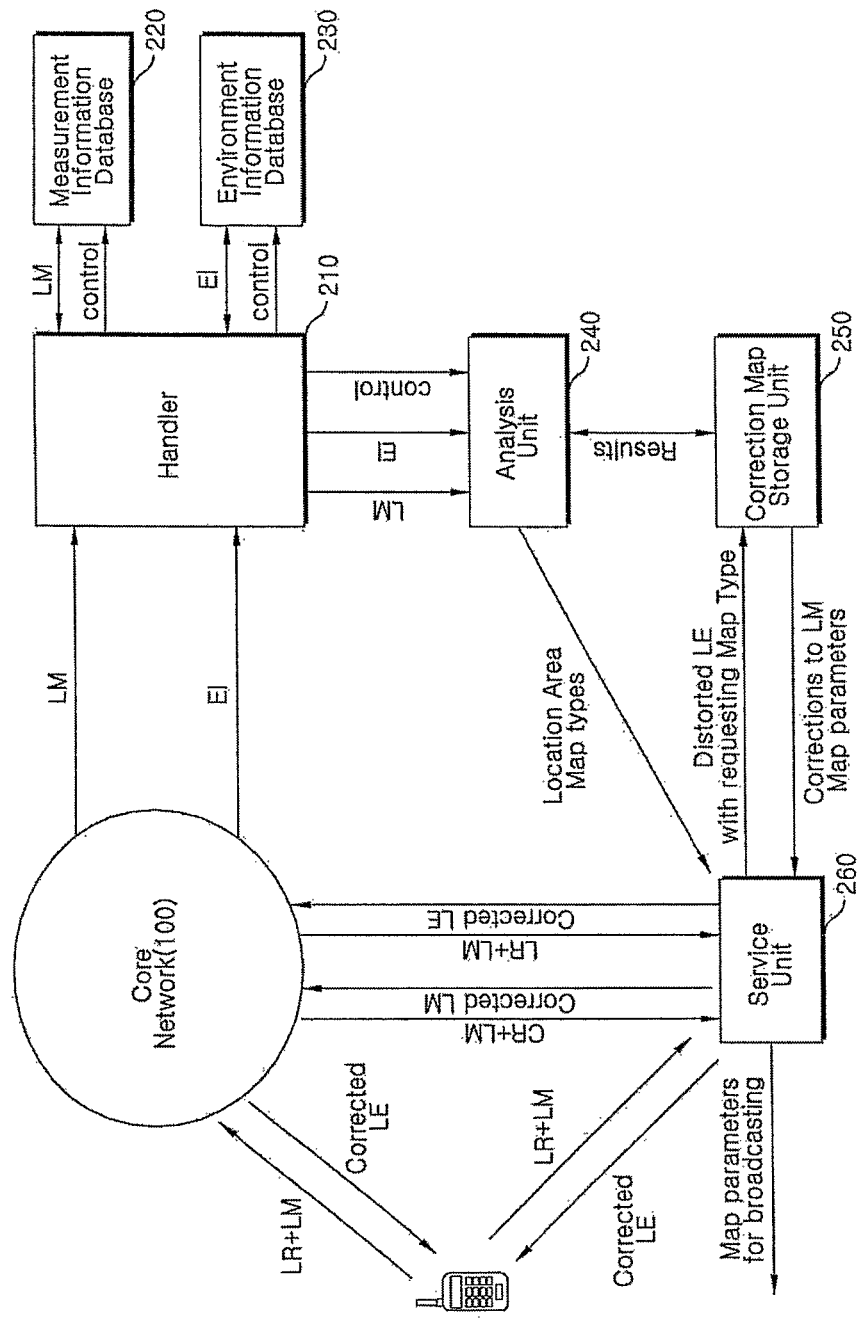
FIG. 3 is a block diagram showing a data exchange among elements constituting the apparatus for correcting location information shown in FIG. 2.

FIG. 3 is a block diagram showing a data exchange among elements constituting the location information correction apparatus shown in FIG. 2.

The handler 210 collects the location measurement information (LM) and the environment information (EI) from the core network 100, and stores the information in the measurement information database 220 and the environment information database 230, respectively. The handler 210 uses a temporary mobile subscriber identity (TMSI) to protect the privacy of a user of a mobile communication terminal which provides location measurement information. That is, in the event TMSI is used, personal information of the mobile communication terminal is not used, and the user's privacy can thus be protected.

The analysis unit 240 analyzes the LM and EI collected from the handler 210, makes a correction map, and stores the correction map in the correction map storage unit 250. A method of analyzing the LM and EI and making the correction map will be described with reference to FIGS. 5 and 6. The correction map thus generated is based on the distorted location estimate of the mobile communication terminal. The location estimate of the mobile communication terminal is distorted since it is calculated based on the location measurement (LM) information which is not corrected or sufficiently corrected.

For a more accurate location estimate, different measurements which are used in location estimate may be assigned different weights, in addition to bias correction values which are applied to the location measurement information. The different weights are based on statistics such as the magnitude of noise contained in each of the measurements. According to the kinds of location measurement information, such as signal strength (SS), time of arrival (TOA), and time difference of arrival (TDOA), various kinds of correction maps, such as an SS bias correction map, an SS weight map, a TOA correction map, a TOA weight map, a TDOA correction map, and a TDOA weight map, are generated.

In addition, a location area of a mobile communication terminal is considered. The location area implies a combination of cells which are assigned to each of base stations. The analysis unit 240 generates the above-mentioned correction maps, and transmits the location area and the kind of a correction map to the service unit 260.

The handler 210 and the analysis unit 240 generate the correction map and prepare for services. The service unit 260 controls data input/output to provide location services to the mobile communication terminal in real time. The service unit 260 selectively provides a corrected location estimate (corrected LE) response, a corrected location measurement (corrected LM) response, a correction-value broadcast, etc.

In more detail, the corrected LE response means that when the service unit 260 receives location request (LR) together with location measurement (LM) information of a mobile communication terminal, i.e., 'LR+LM', the service unit 260 uses the correction map stored in the correction map storage unit 250 to generate the corrected LE and provides the corrected LE response to a user.

The corrected LM response means that when the service unit 260 receives the correction Request (CR) together with location measurement (LM) information of a mobile communication terminal, i.e., 'CR+LM', the service unit 260 uses the correction map stored in the correction map storage unit 250 to correct the LM information transmitted from the mobile communication terminal, and provides the corrected LM response to the mobile communication terminal.

The correction-value broadcast means that without any request from the mobile communication terminal, the service unit 260 broadcasts location area, location calculation method, the kind of correction map, coefficients of correction map and the like in a format which is convenient for the user to use. When the mobile communication terminal receives information concerning the correction-value broadcast, the mobile communication terminal, instead of the service unit 260, can generate the corrected location estimate in case of the corrected LM response. The information concerning the correction-value broadcast indicates all information related thereto.

While FIG. 3 shows the service unit 260 which is directly connected to the core network 100, the service unit 260 may be connected to another communication network, such as wired Internet, wireless Internet (WiBro, WiMAX, WLAN), broadcast network with fixed frequency, or satellite and terrestrial DMB network. In case of the location and corrected LE response service of the service unit 260, a bidirectional communication function is required to receive the user's request. In case of the correction-value broadcast service, a unidirectional communication function is used since the user's request is not necessary.

Figure 4:
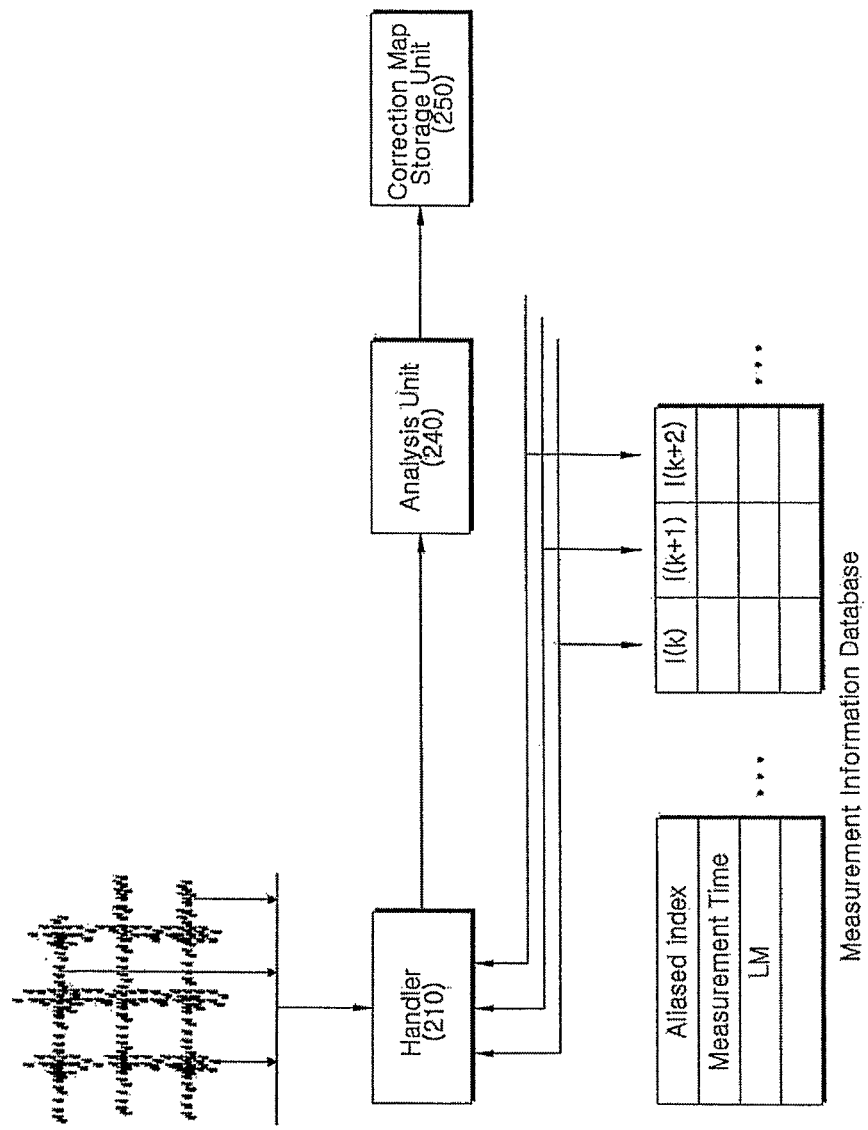
FIG. 4 is a view for explaining the operation of collecting location measurement information of mobile communication terminals and storing the location measurement information in a measurement information database according to an exemplary embodiment of the present invention.

FIG. 4 is a view for explaining the operation of collecting location measurement information of mobile communication terminals and storing the location measurement information in a measurement information database according to an exemplary embodiment of the present invention.

The handler 210 collects location measurement information of a mobile communication terminal from a mobile communication network and stores it in the measurement information database 220. Data stored in the measurement information database 220 includes aliased index, measurement time, and location measurement information. The aliased index is used to index location measurement information in the measurement information database. For example, Temporary Mobile Subscriber Identity (TMSI) may be used as the aliased index. That is, TMSI or similar identifier may be used to request location measurement information from a mobile communication terminal without disturbing a person's privacy on the mobile communication network.

Figure 5:
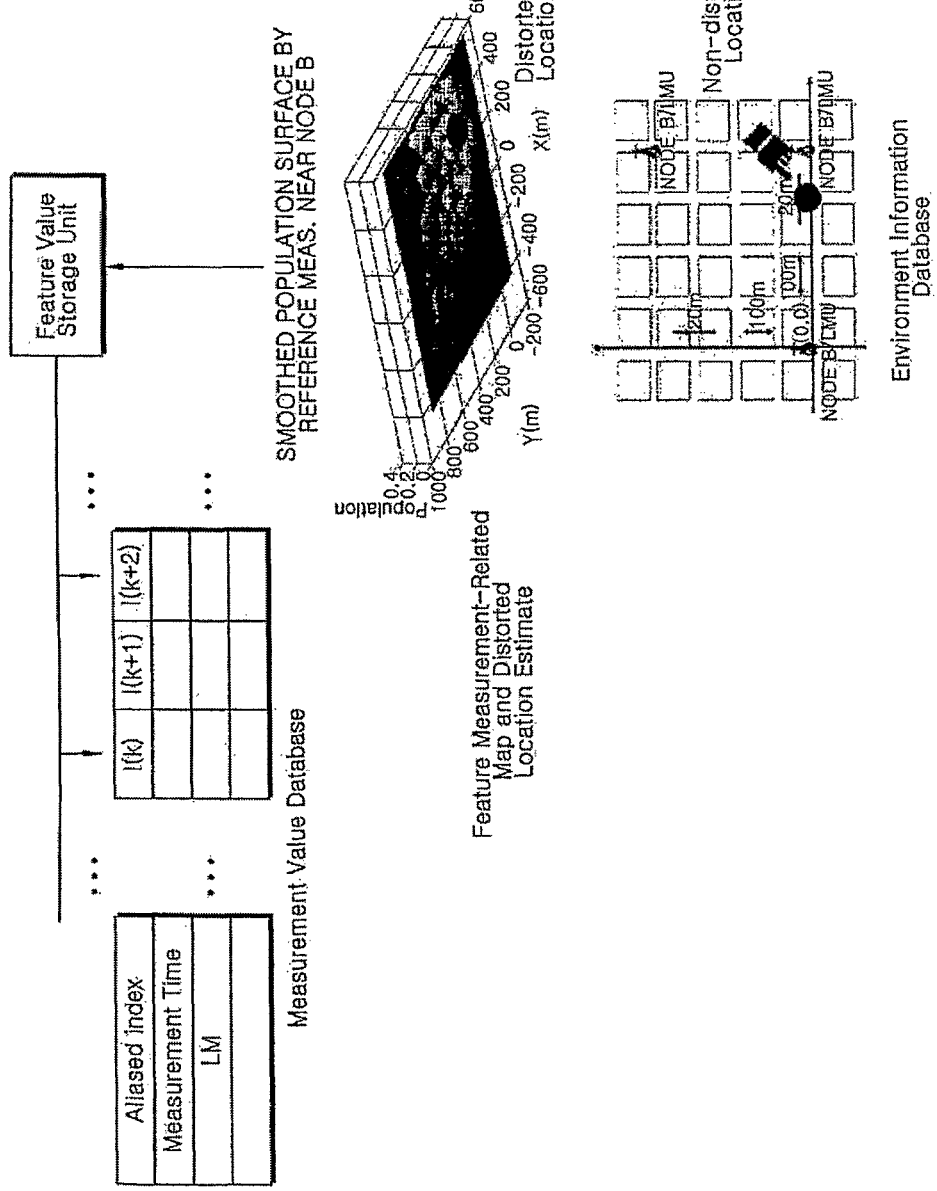
FIG. 5 is a view for explaining a method of extracting feature measurements corresponding to corrected locations.

FIG. 5 is a view for explaining a method of extracting feature measurements corresponding to corrected locations.

The analysis unit 240 extracts location measurement information satisfying a predetermined condition from the measurement information database, sets the extracted location measurement information as feature measurement (FM), and stores the FM in an FM storage unit. Examples of the predetermined condition include occurrence of the maximum/minimum of a certain measurement, occurrence of a maximum/minimum value on a feature map, and establishment of a certain condition equation. For instance, when the signal strength of a signal received from a base station is a maximum value, it means that a corresponding mobile communication terminal is present in the vicinity of the base station, such that the feature measurement (FM) can be extracted. For another example, as shown in FIG. 5, the feature measurement (FM) may be extracted by generating a feature map, such as a distorted distribution of mobile communication terminals, based on measurement information stored in the measurement information database, and comparing the distorted distribution of mobile communication terminals and information concerning roads and topography stored in the environment information database.

Feature location (FL) is obtained by using the extracted feature measurement (FM) and a location calculation equation $f(\ )$ (i.e., $f(FM)$). The location calculation equation $f(\ )$ varies according to the location measurement information (LM), such as SS, TOA, TDOA or AOA. However, in case of the same location measurement information, the same calculation equation is used.

The analysis unit 240 uses the environment information database to create a map of an area of which location measurement information is collected, and uses the measurement information database to create a distorted distribution of mobile communication terminal or a feature map. An operator corrects the feature location and feature map through graphic user interface (GUI). For another example, a plurality of similar feature measurements (FM) are extracted with respect to a single feature location and are averaged in space and time, thereby obtaining a single equivalent feature measurement.

Figure 6:
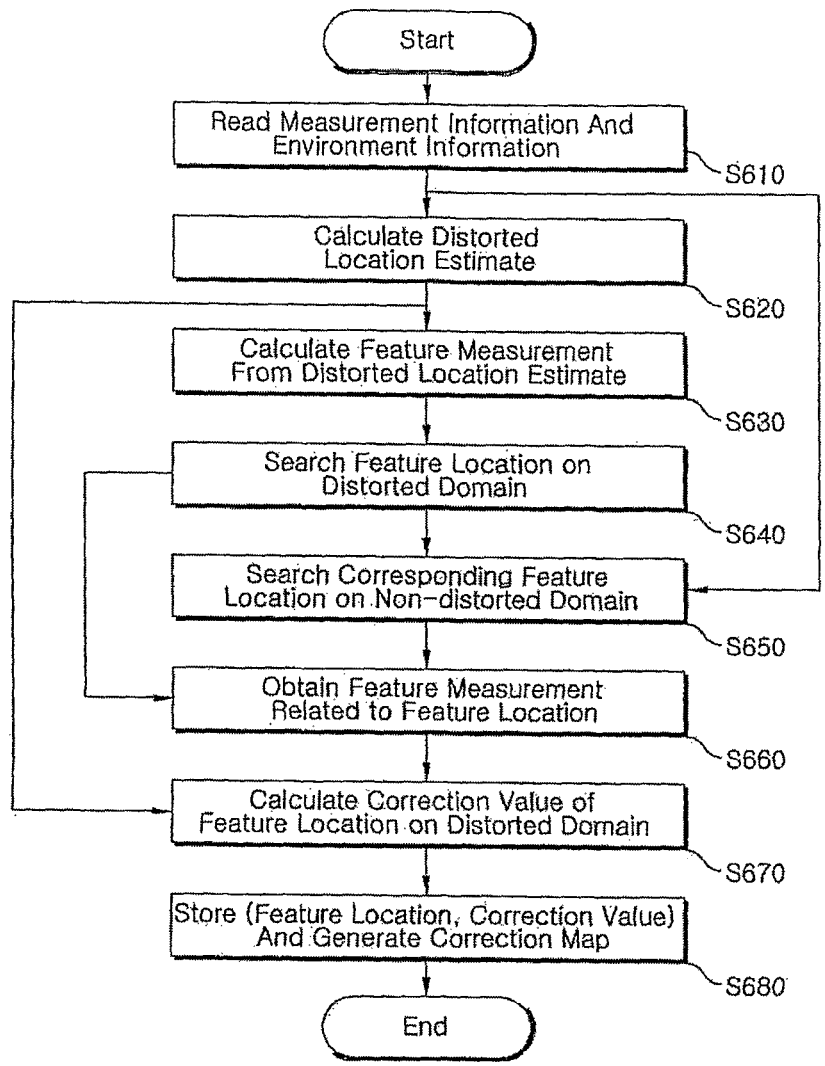
FIG. 6 is a flow chart of a method of searching feature locations to generate a correction map.

FIG. 6 is a flow chart of a method of searching a plurality of feature locations to generate a correction map according to an exemplary embodiment of the present invention.

FIG. 6 illustrates a procedure of using a plurality of feature locations and feature measurements related to the feature locations to create a correction map.

The measurement information and environment information are read (S610). A distorted location estimate is calculated (S620). The calculated location estimate is used to calculate feature measurements and correction values of each of the feature locations. That is, the feature measurements are calculated from the distorted location estimate (S630). A feature location (FL) is detected on a distorted domain (S640).

A feature location is searched on a non-distorted domain (S650). Feature measurement related to each of the feature locations is detected (S660). In this case, the feature location on the distorted domain which is detected at S640 is used.

The correction value of each of the feature locations is calculated on the distorted domain (S670). A plurality of {feature locations, correction values} is stored and a correction map is generated (S670).

Figure 7:
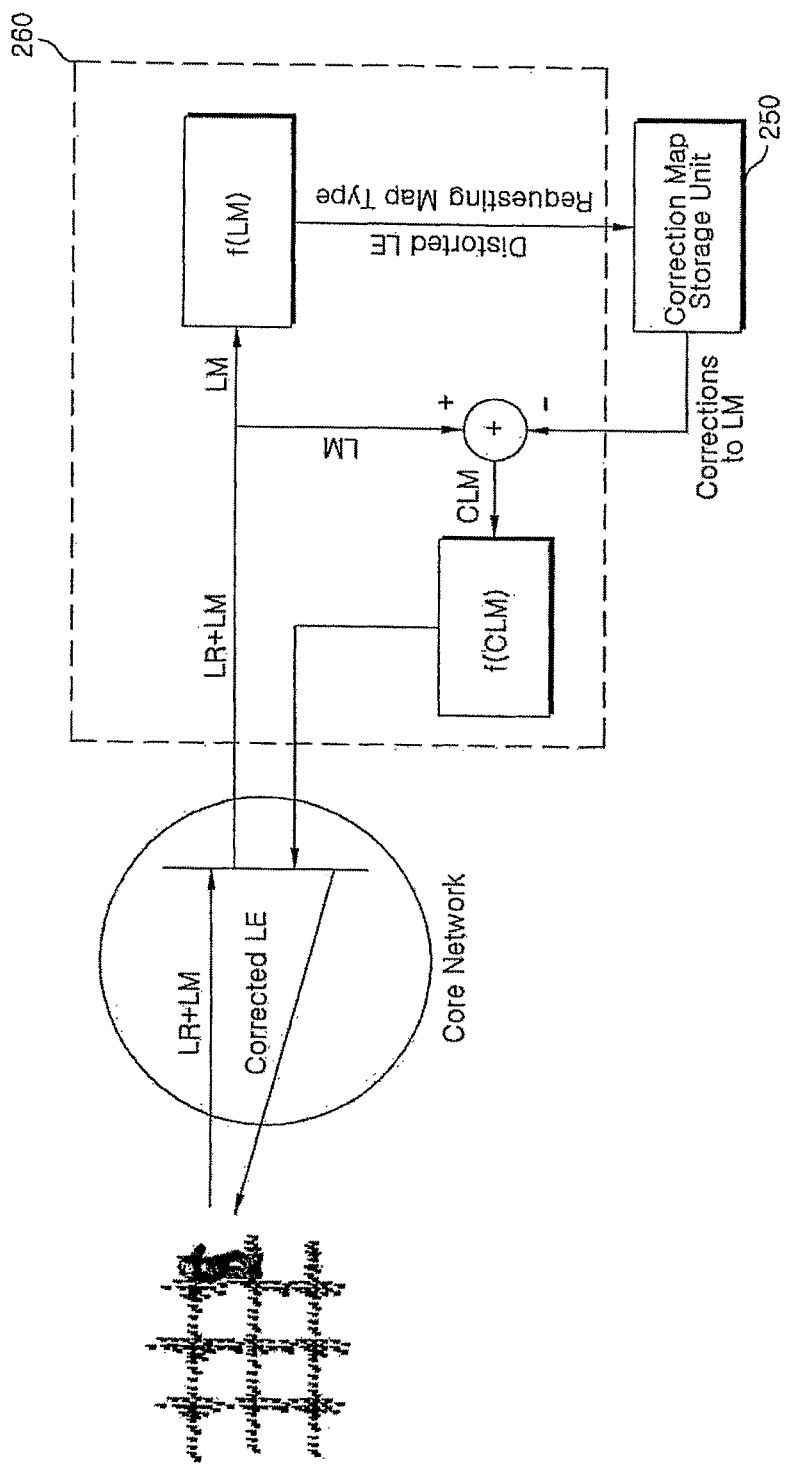
FIG. 7 is a view for explaining the operation of a service unit in an apparatus for correcting location information according to an exemplary embodiment of the present invention.

FIG. 7 is a view for explaining the operation of a service unit in a location information correction apparatus.

When a mobile communication terminal sends location measurement information (LM) and location request (LR), the service unit receives the LM and LR, and calculates a distorted location estimate f(LM) by a location calculation equation f( ). The calculated location estimate f(LM) and the kind of a measurement are transferred to the correction map storage unit to request a correction value with respect to the location measurement information. The correction map storage unit outputs the correction value with respect to the location measurement information (LM).

After the service unit receives the correction value with respect to the location measurement information, the service unit adds the correction value to the location measurement information of the mobile communication terminal, and calculates the corrected LM (CLM). The calculated f(CLM) is retransmitted to the mobile communication terminal.

As described above, the service unit provides a corrected location estimate (corrected LE) response, a corrected location measurement (corrected LM) response, or a correction-value broadcast.

The above-mentioned method according to the present embodiment of the invention may be stored in any form of recording media, such as CD-ROM, RAM, ROM, floppy disk, hard disk, or magneto-optical disk, or in any computer-readable form, such as computer code organized into executable programs. A description of a method of storing an exemplary embodiment of the present invention is well known in the art and will be omitted.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention can be efficiently applied to a method and apparatus for correcting location information of a mobile communication terminal, which corrects spatiotemporal errors contained in actual location information of the mobile communication terminal to generate a correction map.

The invention claimed is:

1. An apparatus for correcting location measurement information of mobile communication terminals, comprising:
   a handling hardware processor configured to automatically collect downlink location measurement information sampled without user intervention by anonymous mobile communication terminals at unknown locations with respect to base stations to prepare measurement correction map generation, and environment information containing locations of the base stations and arrangements of roads or buildings from a network;
   a database configured to store the location measurement information from the anonymous mobile communication terminals based on an internally-generated aliased index, and configured to store the environment information;
   an analysis hardware processor configured to analyze the location measurement information and the environment information to generate measurement correction maps to prepare correction information service;
   a measurement correction map database configured to store the measurement correction maps; and
   a service hardware processor configured to refer to the stored measurement correction maps and to provide a corrected location measurement service, or a measurement correction-value broadcast service to mobile communication terminals which request location services regardless of providing their previous downlink location measurements information to the handler.

2. The apparatus of claim 1, wherein the network is wired Internet, wireless Internet, broadcast network with fixed frequency, satellite or terrestrial DMB network, or any other wired or wireless network.

3. The apparatus of claim 1, wherein the apparatus is installed outside the network.

4. The apparatus of claim 1, wherein the handling hardware processor uses the internally-generated aliased index to search the location information of the mobile communication terminal.

5. The apparatus of claim 4, wherein the internally-generated aliased index prevents identifying and tracking of any specific mobile communication terminal.

6. The apparatus of claim 1, wherein the analysis hardware processor extracts location measurement information satisfying a predetermined condition from the measurement information database, sets the extracted location measurement information as feature measurements, and uses the feature measurements to generate a correction map.

7. The apparatus of claim 1, wherein the analysis hardware processor generates a feature map, such as a distorted distribution of mobile communication terminals, based on the measurement information stored in the measurement information database, compares the distorted distribution of mobile communication terminals and road and topography information stored in the environment information database to extract feature measurement information, and uses the feature measurement information to generate a correction map.

8. The apparatus of claim 1, wherein the service hardware processor receives location measurement information (LM) of the mobile communication terminal and location request (LR) from the mobile communication terminal, calculates a distorted location estimate f(LM) from the location measurement information, transmits the location estimate f(LM) and the kind of a measurement to a correction map storage hardware processor to request a correction value to the location measurement information, receives the correction value from the correction map storage hardware processor, adds the correction value to the location measurement information to calculate a corrected location measurement information (CLM), and sends the corrected location measurement information to the mobile communication terminal.

9. A method for correcting location measurement information of mobile communication terminals, comprising:
automatically collecting downlink location measurement information sampled without user intervention by anonymous mobile communication terminals at unknown locations with respect to base stations to prepare measurement correction map generation, and environment information containing locations of base stations and arrangements of roads or buildings from a network;
generating a measurement correction map by analyzing the location measurement information from the anonymous mobile communication terminals based on an internally generated aliased index and the environment information; and
providing a corrected location measurement service, or a measurement correction value broadcast service to mobile communication terminals which request location services regardless of providing their previous downlink location measurement information to a handling hardware processor by using the measurement correction map.

10. The method of claim 9, wherein the network is wired Internet, wireless Internet, broadcast network with fixed frequency, satellite or terrestrial DMB network, or any other wired or wireless network.

11. The method of claim 9, wherein receiving location measurement information of the mobile communication terminals and environment information comprises using an internally-generated aliased index to designate a set of location measurements from different mobile communication terminals and different time instants.

12. The method of claim 11, wherein the internally-generated aliased index prevents identifying and tracking of any specific mobile communication terminal.

13. The method of claim 9, wherein generating a correction map comprises extracting location measurement information satisfying a predetermined condition among the location measurement information, setting the extracted location measurement information as feature measurements, and using the feature measurements to generate a correction map.

14. The method of claim 9, wherein generating a correction map comprises generating a feature map, such as a distorted distribution of mobile communication terminals, based on the measurement information, comparing the distorted distribution of mobile communication terminals and the environment information containing road and topography data to extract feature measurement information, and using the feature measurement information to generate a correction map.

* * * * *